United States Patent [19]

Moore et al.

[11] Patent Number: 5,418,369

[45] Date of Patent: May 23, 1995

[54] SYSTEM FOR CONTINUOUSLY MONITORING CURING ENERGY LEVELS WITHIN A CURING UNIT

[75] Inventors: Robert C. Moore, Roswell; James R. Petisce, Norcross; Carl R. Taylor, Lawrenceville, all of Ga.

[73] Assignee: AT&T Corp., Murray Hill, N.J.

[21] Appl. No.: 30,501

[22] Filed: Mar. 12, 1993

[51] Int. Cl.$^6$ ................................................ G01J 1/18
[52] U.S. Cl. ................................ 250/372; 250/492.1
[58] Field of Search ............ 250/372, 338.1, 492.1, 250/435

[56] References Cited

U.S. PATENT DOCUMENTS

| | | |
|---|---|---|
| 4,165,463 | 8/1979 | Bowen .............................. 250/372 |
| 4,474,830 | 10/1984 | Taylor . | 
| 4,591,724 | 5/1986 | Fuse et al. ...................... 250/492.1 |
| 4,629,896 | 12/1986 | Bridgen .............................. 250/372 |
| 4,665,627 | 5/1987 | Wilde et al. ................... 250/372 X |
| 4,849,640 | 7/1989 | Kruishoop ..................... 250/492.1 |
| 4,913,859 | 4/1990 | Overton et al. .................... 264/1.4 |
| 5,000,772 | 3/1991 | Petisce . |
| 5,037,763 | 8/1991 | Petisce . |

FOREIGN PATENT DOCUMENTS

| | | | |
|---|---|---|---|
| 0314174 | 5/1989 | European Pat. Off. . | |
| 61-270628 | 11/1986 | Japan .................................. | 250/372 |
| 2168230 | 6/1986 | United Kingdom ............. | 250/492.1 |

OTHER PUBLICATIONS

Patent Abstracts of Japan, vol. 13, No. 101 9 Mar. 1989 & JP-A-63 277 538 (Sumitomo Electric Ind. Ltd) 15 Nov. 1988.
Patent Abstracts of Japan, vol. 12, No. 186 (C-500) 31 May 1988 & JP-A-62 292 657 (Furukawa Electric Co. Ltd) 19 Dec. 1987.
Patent Abstracts of Japan, vol. 14, No. 390 (C-751) 23 Aug. 1990 & JP-A-02 145 456 (Furukawa Electric Co. Ltd) 4 Jun. 1990.
Patent Abstracts of Japan, vol. 12, No. 219 (C-506) 22 Jun. 1988 & JP-A-63 017 240 (Sumitomo Electric Ind. Ltd) 25 Jan. 1988.
Patent Abstracts of Japan, vol. 11, No. 398 (C-466) 25 Dec. 1987 & JP-A-62 158 143 (Sumitomo Electric Ind. Ltd) 14 Jul. 1987.

*Primary Examiner*—Constantine Hannaher
*Assistant Examiner*—Edward J. Glick
*Attorney, Agent, or Firm*—Donald E. Hayes, Jr.

[57] ABSTRACT

The present invention continuously monitors the amount of curing radiation available for curing coating material on a moving optical fiber and includes a curing system having a radiation source capable of providing radiation energy for curing coating material on an optical fiber and a reflector system which redirects non-direct radiation back toward the article. An optical fiber which has been provided with a curable coating material is moved along a path of travel through a curing area. The coating material is cured by causing the radiation source to emit energy suitable for curing the curable coating material. The predictable average amount of light energy properly redirected by the reflector system toward the curable article is sensed as the curable coating material is being cured to obtain continuous in-process reading. The average radiation value is obtained by positioning three longitudinally aligned holes adjacent the fiber path and between the fiber and a radiation sensing device. Furthermore, the amount of the light energy available from the reflector system may be sensed at a location which is outside the reflector system to obtain a reference reading. The in-process readings may then be compared with the reference reading to determine the portion of the radiation available from the radiation source which is actually available for curing the curable coating material.

6 Claims, 3 Drawing Sheets

SYSTEM FOR CONTINUOUSLY MONITORING CURING ENERGY LEVELS WITHIN A CURING UNIT

TECHNICAL FIELD

This invention relates to a system for continuously monitoring curing energy levels within a curing unit. More particularly, this invention relates to a monitor which continuously indicates the amount of radiation of curing energy properly impinging the element to be cured by the curing system.

BACKGROUND OF THE INVENTION

Radiation curable materials have penetrated several areas of commerce due to their characteristic rapid processing speeds. One class of radiation curable materials are converted from a liquid to a solid upon exposure to energy from the ultraviolet portion of the electromagnetic spectrum. Such materials are commonly referred to as UV curable materials. Examples of such materials include UV curable optical fiber coatings, optical fiber cabling materials, adhesives, floor coatings, wood coatings, and metal beverage can coatings. Another class of radiation curable materials are converted from a liquid to a solid upon exposure to visible light. Such materials are commonly referred to as visible light curable materials. Examples of such materials include optical fiber coatings, pigmented inks, and adhesives.

A characteristic of all radiation curable materials is that their extent of cure is dependent upon the amount of exposed curing radiation, referred to as dose. Cure dose is a variable which is sought to be carefully controlled during processing of radiation curable materials in order to ensure complete cure of the material. Some general methods currently used to control radiation curing dose include:

1. Careful control of processing line speed;
2. Consistent exposure time for fixed substrates;
3. Output power meters for the curing radiation sources;
4. Preventive maintenance of curing radiation source reflector systems;
5. Routine replacement of curing radiation sources; and
6. Off-line, destructive quality control inspection of cured article to gauge the ultimate degree of cure achieved.

One growing area of use for curable materials is as coatings for optical fibers. In the manufacture of optical fiber, a perform is suspended vertically and moved into a furnace. Optical fiber is drawn from the perform and afterwards is provided with one or more layers of various liquid coating material. In general, the liquid coating material is a curable coating material and typically it is an ultraviolet (UV) light energy curable material.

Curing of the coating materials is accomplished by moving successive lengths of the optical fiber having the coating material thereon through a center tube which is disposed within an elliptically shaped housing as depicted in U.S. Pat. No. 5,000,772. At one loci of the elliptical shape is disposed a curing lamp; at the other, the center tube. The elliptical housing has reflective surfaces for reflecting curing energy toward engagement with the optical fiber.

Furthermore, a quartz center tube is sometimes used to maintain an oxygen-free atmosphere ($N_2$) for a high degree of cure of the secondary or exterior coating layer.

Disadvantageously, the interior surface of the center tube is often adiabatic. Furthermore, the heat of polymerization of the coating material and the absorption of radiation from the UV lamps may heat the fiber temperature to about 130° C. or higher. Given that many coating materials devolitize at temperatures greater than about 90° C., deposits of volatiles form on the inner surface of the center tube even during normal usage.

Notwithstanding the rapid flow of nitrogen gas through the center tube, there normally are sufficient contaminants deposited within about eight hours of operation of the draw line to cause about 30-40% of the ultraviolet (UV) radiation incident to the center tube surface to be absorbed instead of being transmitted toward the optical fiber as desired. This attenuation decreases the degree of cure of the optical fiber coating material, particularly as the rate of reaction increases with the UV dose. Accordingly, the center tubes must be replaced on a regular basis.

Presently, it is typical practice after the fiber has been drawn to measure the degree of cure with an off-line pullout test. In such a pullout test, the force required to pull a 1 cm length of optical fiber out of its coating is measured. This existing off-line technique offers no real-time feedback as to the overall effectiveness of the cure. Furthermore, the existing pull-out test provides no ability to isolate any particular deficiencies which may exist in various stages or components of the curing system.

One other technique presently known to monitor the degree of cure of a coating material is disclosed in commonly assigned U.S. Pat. No. 5,037,763 which issued in the name of J. R. Petisce on Aug. 6, 1991. This patent facilitates the in-line monitoring of the degree of cure by including a probe within the coating material. The probe comprises a material which emits light subsequent to being promoted to an excited electronic state.

What is sought after and what seemingly is not available in the prior art is an on-line monitoring system which may be used to continuously monitor the overall curing effectiveness of the curing system.

SUMMARY OF THE INVENTION

The foregoing problems of the prior art have been solved by the method and apparatus of this invention. The present invention continuously monitors the amount of curing radiation available for curing coating material on a moving optical fiber and includes a curing system having a radiation source capable of providing radiation energy for curing coating material on an optical fiber and a reflector system which redirects non-direct radiation back toward the article. An optical fiber which has been provided with a curable coating material is moved along a path of travel in a curing area. The coating material is cured by causing the radiation source to emit energy suitable for curing the curable coating material. The predictable average amount of light energy properly redirected by the reflector system,toward the curable article is sensed as the curable coating material is being cured to obtain continuous in-process reading. The average radiation value is obtained by positioning three longitudinally aligned holes adjacent the fiber path and between the fiber and a radiation sensing device. Furthermore, the amount of the light energy available from the reflector system may be sensed at a location which is outside the reflector system to obtain a reference reading. The in-process readings may then be compared with the reference reading to determine the portion of the radiation available from the radiation source which is actually available for curing the curable coating material.

BRIEF DESCRIPTION OF HE DRAWING

Other features of the present invention will be more readily understood from the following detailed description of specific embodiments thereof when read in conjunction with the accompanying drawings, in which.

DETAILED DESCRIPTION

Figures 1, 2:
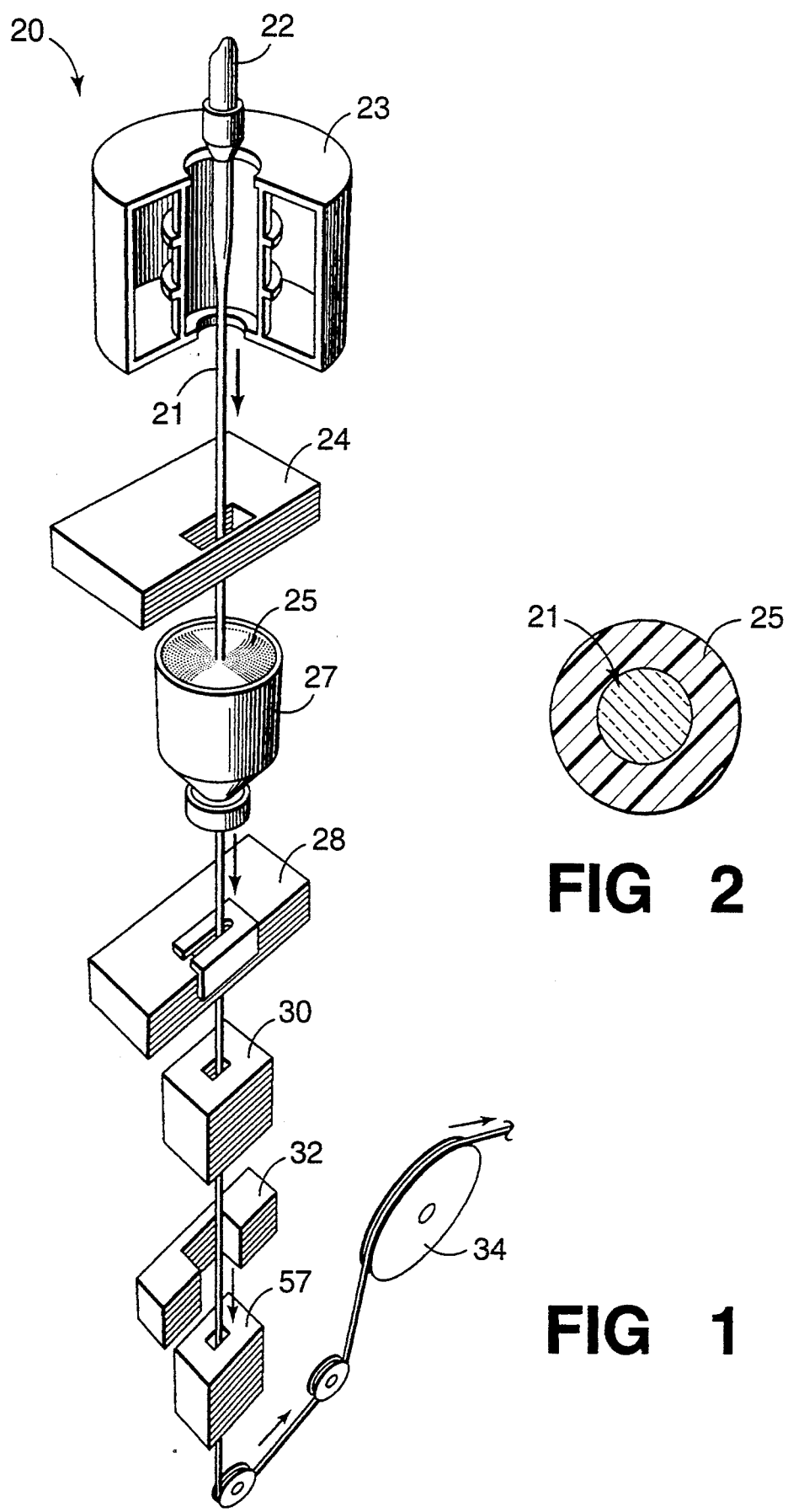
FIG. 1 is a schematic view of a manufacturing line which is used to provide one or multiple coating materials for a drawn optical fiber.
FIG. 2 is an end view in section of an optical fiber having a coating provided by portions of the apparatus of FIG. 1.

Referring now to FIG. 1, there is shown an apparatus which is designated generally by the numeral 20 and in which is used to draw optical fiber 21 from a specially prepared cylindrical preform 22 and for then coating the fiber. The optical fiber 21 is formed by locally and symmetrically heating the preform 22, typically 7 to 25 mm in diameter and 60 cm in length, to a temperature of about 2000° C. As the preform is fed into and through a furnace 23, fiber 21 is drawn from the molten material.

As can be seen in FIG. 1, the elements of the draw system include the furnace 23 wherein the preform is drawn down to the fiber size after which the fiber 21 is pulled from the heat zone. The diameter of the fiber 21 is measured by a device 24 at a point shortly after the fiber is formed and this measured value becomes an input into a control system. Within the control system, the measured diameter is compared to the desired value and an output signal is generated to adjust the draw speed such that the fiber diameter approaches the desired value.

After the diameter of the fiber 21 is measured, a protective coating 25 (see also FIG. 2) is applied to it by apparatus 27. Preservation of fiber strength requires the application of the protective coating, which shields newly drawn fiber from the deleterious effects of the atmosphere. This coating must be applied in a manner that does not damage the surface of the fiber 21 and such that the fiber has a predetermined diameter and is protected from abrasion during subsequent manufacturing operations, installation and service. Minimizing attenuation requires the selection of a suitable coating material and a controlled application of it to the fiber. Such a coating apparatus may be one such as that described in U.S. Pat. No. 4,474,830 which issued on Oct. 2, 1984 in the name of C. R. Taylor. Minimizing diameter variation which in turn minimizes the losses due to misalignment at connector and splice points requires careful design of the draw system and the continuous monitoring and control of the fiber diameter during the drawing and the coating steps of the process. Then, the coated fiber 21 is passed through a centering gauge 28.

After the coating material has been applied to the drawn fiber, the coating material must be cured. Accordingly, the optical fiber having the coating material thereon is passed through a device 30 for curing the coating, a device 32 for measuring the outer diameter of the coated fiber and a device 57 for monitoring the degree of cure of the coating material. Afterwards, it is moved through a capstan 34 and is spooled for testing and storage prior to subsequent cable operations.

While one embodiment of the present invention specifically addresses a manufacturing line which applies coatings to a single drawn fiber, it should be noted that the curing monitoring system of the present invention is also applicable to manufacturing of bonded ribbons. Such bonded ribbons include a plurality of coated optical fibers disposed in a planar array and held together in that array by a matrix material. Although reference herein may be made only to the coating material or to the matrix material, it should be understood that the following applies to both.

Figure 3:
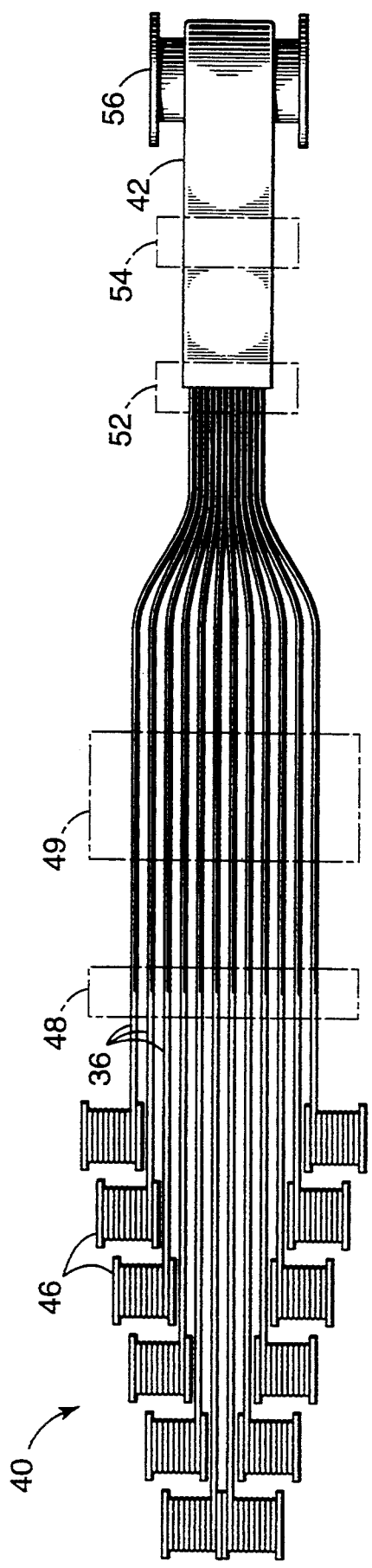
FIG. 3 is a schematic view of a manufacturing line which is used to provide a matrix material for a plurality of optical fibers disposed in an array.

Referring now to FIG. 3, there is shown a schematic view of such an alternative manufacturing line which is designated generally by the numeral 40. The line 40 is capable of manufacturing a bonded ribbon 42 (see FIG. 4). The ribbon 42 includes a plurality of coated optical fibers 36—36 each of which includes a core, a cladding and one or more layers 25—25 of coating material.

Figure 4:
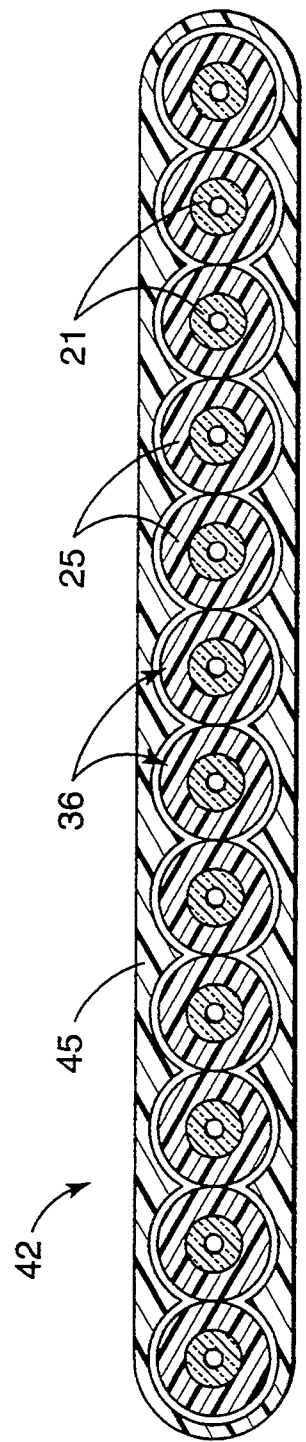
FIG. 4 is an end view in section of an optical fiber array which is embedded in a matrix material.

As can be seen in FIG. 4, the optical fibers 36—36 may be disposed in a planar array. The fibers are held bonded together in that array by a matrix material 45. It is common to refer to such a structure as a bonded ribbon. In a preferred embodiment, the matrix material is an ultraviolet (UV) curable material.

Along the line 40, a plurality of the optical fibers 36—36 are payed out from supplies 46—46, and an ink from a reservoir is applied thereto by an applicator 48. Afterwards, the ink is dried in an oven 49. Then the optical fibers are gathered together and embedded in the curable matrix material in an applicator 52. The applicator 52 may be an extruder, for example. Afterwards, the array in the matrix material is directed past an apparatus 54 which is used to cure the curable matrix material, past an apparatus 59 which is used to monitor the degree of cure of the curable matrix material and subsequently taken up on a spool 56.

As mentioned, after the curable coating material has been applied to the drawn optical fiber or the curable matrix material to the array of optical fibers, the coating or the matrix material must be cured. The coating material may be cured by thermal, electron beam, microwave, or ultraviolet energy. For the preferred embodiment, the curable material may comprise a silicone-based material, an acrylate-based material or a vinyl-based material.

For rapid application and cure, coatings which cure on exposure to radiation, preferably ultraviolet radiation, are needed. However, radiation-curable coatings for optical glass fiber may be of various types, but it is always necessary to provide the low to moderate tensile modulus needed in a coating which will contact the glass, to employ a polycthylenic polymeric organic compound. Many appropriate polyethylenic organic compounds are known and are deemed acceptable and within the scope of the present invention.

While the two specific embodiments presented herein are directed to curing coating material on either a single optical fiber or a plurality of fibers arranged as a bonded ribbon, it should also be noted that the curing dose monitoring system of the present invention is also applicable to curing various types of coloring components sometimes applied to fiber(s).

The present invention is directed to a method and apparatus for monitoring the overall operational effectiveness of a curing system specifically addressing such systems presently used in drawing optical fiber. In general, it is accepted that at least three factors affect the amount of curing radiation which ultimately reaches the coatings applied to a fiber. These factors include 1) output power level of the radiation source, 2) the cleanliness of the center tube if such device is used, and 3) the efficiency of the reflector system. In order to accurately monitor the overall effectiveness of the curing system, the present invention is capable of continuously gauging substantial changes in any of the three factors identified above which may adversely affect the ultimate cure of the coatings.

It is generally known and accepted that there is a direct relationship between the energy level of a radiation source and the degree or rate of cure of the curable material. Similarly, it is also known and accepted that there is a direct relationship between the range of emission wavelengths generated by a radiation source and the degree or rate of cure achieved by a particular curable material. Therefore, the specific importance of the radiation source output level and characteristics will not be further discussed below. However, with regard to the effects on curing attributable to either the cleanliness of the center tube or the efficiency of the reflector system, a brief discussion may be warranted and therefore follows below.

Disadvantageously, as a result of high temperatures within the elliptical reflector system, the optical fiber coatings emit chemical vapors during the drawing of optical fiber from a preform. These vapors deposit on an inner surface of the center tube and significantly attenuate UV light energy which reaches the optical fiber coating during a draw. A possible consequence of excessive attenuation of UV curing light energy is an unacceptable degree of cure of the coating materials.

Figure 5:
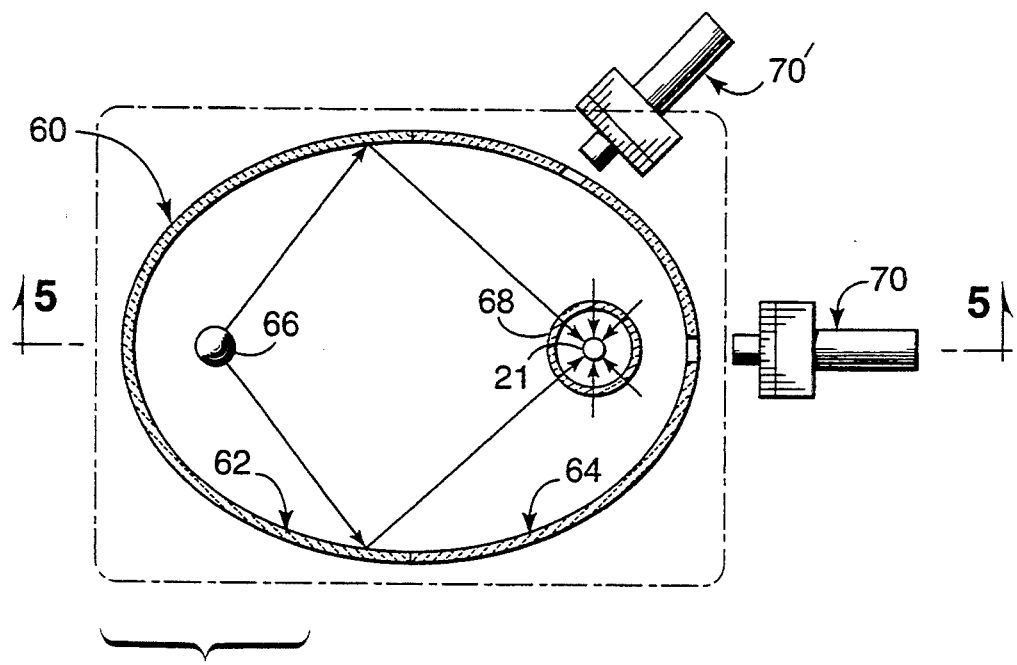
FIG. 5 is a top view of a radiation energy curing apparatus which is used to cure coating materials which have been applied to optical fiber drawn from a preform.
Figure 6:
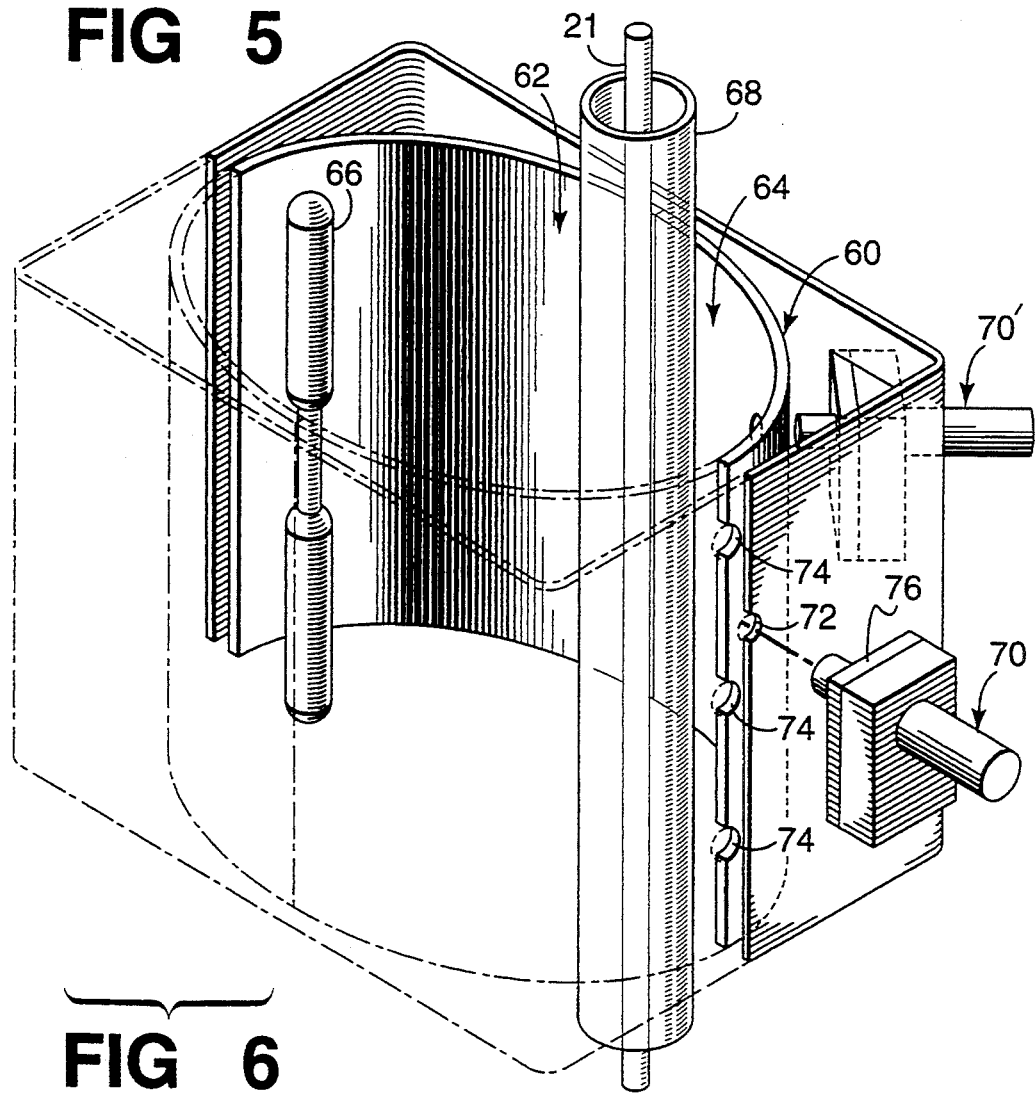
FIG. 6 is an elevational view of the curing apparatus of FIG. 5 as taken along line 5—5 thereof.

Referring now back to element 30 of FIG. 1 and which is diagrammed in more detail in FIGS. 5 and 6, it can be seen that in the preferred embodiment, the curing apparatus of the present invention includes an elliptically shaped reflector 60 comprising a primary reflector portion 62 and a back reflector 64. A radiation curing source 66, which is preferably an ultraviolet light energy bulb, is disposed at one of the loci of the elliptical geometry. Successive increments of length of the drawn optical fibers are moved through a center tube 68. Preferably the center tube 68 is made of quartz and is disposed at the other loci of the elliptical shape.

A center tube monitor may be positioned directly behind the quartz center tube 68 away from the UV light source 66. Additionally, a center tube sensor 70 measures the amount of curing radiation which is transmitted through the center tube 68 to impinge on the optical fiber coating material 25. In addition, a reference monitor may be positioned outside the reflector 70' system 60 and is used to measure the amount of light emitted directly from the UV bulb 66. Such a reference monitor 70' may be used to establish a "reference" reading which may be compared to an "in-process" reading generated by center tube sensor 70. As used herein, "in-process" reading refers to the ability, while drawing fiber, to gain a real time value indicative of the amount of radiation directed to impinge the fiber. This allows a comparison of the amount of curing radiation which is transmitted through center tube 68 and thereby impinging the fiber to the amount of curing radiation being generated by the UV light source 66 which no effect from the center tube. However, other calibration techniques may be employed to periodically generate an average radiometry reading along the length of the fiber, thereby alleviating the need to continuously monitor the radiation output of the source. One such alternative calibration method may involve establishing an emission value for a new radiation source and, based on a profile of the projected life deterioration of such sources, generating an ongoing and accurate base or reference output value of that radiation source throughout its life.

Specifically, as shown in FIGS. 5 and 6, one embodiment of the present invention introduces one hole 72 into the housing of curing assembly and three additional longitudinally arranged holes 74—74 through the reflector surface on the center tube side. Once the radiation is transmitted through the center tube 68, these holes 74—74 provide a path for radiation to pass from the bulb 66 through the reflector surface 64 to the sensor 70. However, the light path described above is indirect since the reflector holes 74—74 are purposefully not aligned with the radiation sensor hole 72.

The plurality of misaligned holes 74—74 establishes the monitor reading as an accurate representation of the average eluding of the center tube, unbiased by an isolated high-intensity signal passing through a single section of the center tube. Additionally, the particular hole alignment of the present invention reduces the effects of alignment error that often occurs during installation of center tube 68.

Even though the preferred embodiment provides for the introduction of three misaligned holes as described above, it should be noted that an equally suitable alternative within the scope of the present invention may involve a longitudinally extending slot which allows for direct illumination of the sensor instead of the indirect illumination as provided in the embodiment shown.

Since the present invention may be directed at serving and measuring various forms of radiation, it should be noted that any well known type of radiomerry may be used in accordance with the present invention.

Preferably, the radiation sensor 70 includes a plurality of photodiodes with a sensitivity value in the range of 320–390 nm and are mounted in a heat-insulating phenolic block 76. Such devices are presently available from Electronic Instrumentation and Technologies Corp. of Sterling, Virginia. The block 76 should be thick enough to act as a sufficient thermal insulator for the cured dose monitoring system. In general, the mounting block 76 is about one inch (1") thick.

For operation, the UV monitors are calibrated to read 100% with a new center tube in place. As a test, the accuracy of the sensors was tested by measuring the clouding of two center tubes, both in the lamps with the sensors and in a lab with a spectrophotometer. A tube with a 12% UV monitor reading measured 10% transmittance on the spectrophotometer at 350 nm, while one with a monitor reading at 60% measured 50% transmittance. A clean tube measured 35% transmittance at the same wavelength. Thereby with this correction, the spectrophotometer and UV sensor readings agreed very well.

The amount of light impinging the fiber coating is equal to the combination of light which passed through the reflective housing, plus the light reflected by the reflector system plus the amount of light emitted from the light source.

The advantages of the methods and apparatus of this invention are many. First, continuous feedback of the optical fiber coating cure process quality is achieved. Secondly, costly, time-consuming off-line quality control testing is no longer needed.

It is to be understood that the above-described arrangements are simply illustrative of the invention. Other arrangements may be devised by those skilled in the art which will embody the principles of the invention and fall within the spirit and scope thereof.

We claim:

1. A method of continuously monitoring the mount of radiation energy available for curing a material on an elongated transmission media, said method including the steps of:

provinding an elongated transmission media coated with a curable material into a curing system which includes a radiation source capable of providing energy for curing the material and a reflector system which redirects non-direct radiation back toward the elongated transmission media, wherein the reflector system is elliptically shaped and comprises a primary reflector portion and a back reflector portion, and wherein the radiation source and the elongated transmission media are each disposed at one of the loci of the elliptically shaped reflector and wherein the elongated transmission media is surrounded by a tubular member made of a material which allows a selected radiation curing energy to pass therethrough;

curing the coating material by causing the radiation source to emit energy suitable for curing the curable coating material;

sensing the amount of radiation generated by the radiation source with at least one reference sensor positioned to receive radiation energy whose direct path is unobstructed by the tubular member surrounding the elongated transmission media;

sensing the amount of radiation directed to impinge the elongated transmission media as the coating material on the transmission media is being cured with at least one in-process sensor positioned opposite the tubular member from the radiation comparing the reading from the reference sensor with the reading from the in-process sensor to determine the portion of the radiated curing energy which is effective in curing the curable coating material.

2. The method of claim 1, wherein the reflector system includes a plurality of boles longitudinally arranged adjacent to the elongated transmission media and positioned between the elongated transmission media and the at least one in-process sensor.

3. The method of claim 1, wherein said elongated transmission media comprises an optical fiber which has been provided with a curable coating material, and further comprising the step of moving said optical fiber along a path of travel through the tubular member.

4. The method of claim 1, wherein said elongated transmission media comprises a plurality of optical fibers, which are disposed in a planar array and which are bonded together by a curable matrix material, and further comprising the step of moving said plurality optical fibers along a path of travel through the tubular member.

5. An apparatus for continuously monitoring the amount of radiation energy available for curing a coating material on a moving elongated transmission media, said monitoring apparatus comprising:

a reflector system which redirects non-direct radiation back toward the elongated transmission media and which includes a radiation source capable of providing energy for curing the coating material on an elongated transmission media; wherein the reflector system is elliptically shaped and comprises a primary reflector portion and a back reflector portion, and wherein the radiation source and the elongated transmission media are each disposed at one of the loci of the elliptically shaped reflector system and wherein the elongated transmission media is surrounded by a tubular member made of a material which allows a selected radiation curing energy to pass therethrough;

a sensor system which measures the amount of radiation generated by the radiation source with at least one reference sensor positioned to receive radiation energy whose direct path is unobstructed by the tubular member surrounding the elongated transmission media and also measures the amount of radiation energy directed to impinge the elongated transmission media as the coating material on the transmission media is being cured with at least one in-process sensor positioned opposite the tubular member from the radiation sorrel and a compared which compares the reading from the reference sensor with the reading from the in-process sensor to determine the portion of the radiated curing energy which is effective in curing the curable coating material.

6. The apparatus of claim 5, wherein the reflector system includes a plurality of holes longitudinally arranged adjacent to the elongated transmission media and positioned between the elongated transmission media and the at least one in-process sensor.

* * * * *